Aug. 14, 1934.     A. L. LAMBERT     1,969,806
VALVE
Filed Jan. 11, 1933
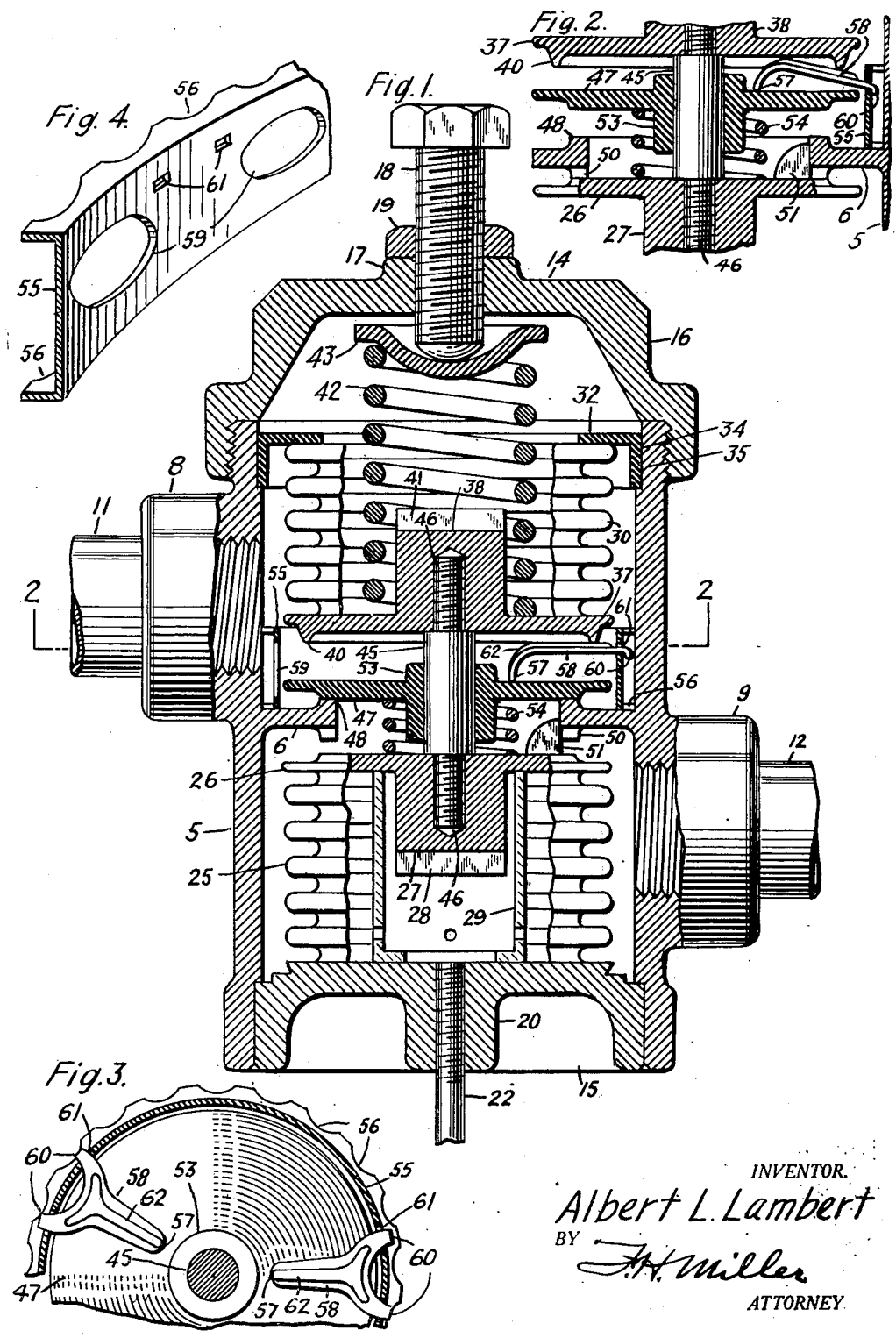
INVENTOR.
*Albert L. Lambert*
BY
*F. H. Miller*
ATTORNEY Patented Aug. 14, 1934

1,969,806

UNITED STATES PATENT OFFICE 1,969,806

VALVE

Albert L. Lambert, Narberth, Pa., assignor to Heintz Manufacturing Company, Philadelphia, Pa., a corporation of Pennsylvania Application January 11, 1933, Serial No. 651,216

9 Claims. (Cl. 137—153)

My invention relates to valves and particularly to balanced valves for operation in response to slight variations in fluid pressures.

One object of my invention is to provide a valve, of the above-indicated character, that shall be supersensitive.

Another object of my invention is to provide a valve that shall be simple and durable in construction, economical to manufacture and effective in its operation.

With such objects in view, as well as other advantages which may be incident to the utilization of the improvement, the invention consists in the parts and combinations thereof hereinafter set forth and claimed, with the understanding that the several necessary elements constituting the same may be varied in proportion, arrangement and texture, without departing from the nature and scope of the invention.

A valve, of the type to which my invention relates, comprises basically a casing divided into two main compartments or chambers communicating, through ports, with the opposite sides or terminals of a fluid-conduit system to be controlled and having a movable valve element therebetween.

An element, or actuator, operates the valve element in response to temperature variations of a control medium, such as the temperature of an enclosed space being heated or cooled by the fluid in the above-mentioned conduit system.

In such valves, compensation for variable pressures in the valve has been effected by the provision of opposed expansion elements so that this factor of error has been eliminated.

However, in a valve of this character, the distance moved by the movable valve element itself has not been sufficient to give full port openings with small temperature differences in the control element.

Accordingly, in practicing my invention, I provide means, such as a system of levers, whereby, for a given movement of the actuator, the valve is moved a greater distance, and a separate source of energy, such as a spring, is adapted to provide the greater movement, of the valve disc and the lever system.

By this means, when employed in combination with the above mentioned opposed expansion elements, a valve is provided in which the moving parts are, in effect, substantially weightless and free from extraneous retarding effects, so that, although they are rugged, simple and durable, they may be adjusted to respond effectively to very slight variations in the control medium, in a valve structure of the most highly sensitive nature.

In effecting the improvement, features of construction, which render the device compact, of easy assembly, strong, light in weight and an improvement generally in its field has been devised, as will appear more clearly from the drawing and the following description.

In order to make the invention more clearly understood, means are shown in the accompanying drawing for carrying the same into practical effect, without limiting the improvements in their useful applications, to the particular constructions which, for the purpose of explanation, are made the subject of illustration.

Figure 1 of the accompanying drawing, is an enlarged side view, partially in elevation and partially in section, of a valve constructed in accordance with my invention, showing the parts in the closed position of the valve;

Fig. 2 is a view of portions of the device, as viewed in Fig. 1, but with the parts as positioned in the open position of the valve;

Fig. 3 is a detail plan view, taken substantially along the line 2—2 of Fig. 1, of portions of the structure shown in Fig. 1, and Fig. 4 is a fragmentary enlarged perspective view of a pivot-support or ring embodied in the invention.

The device comprises a fluid-tight, preferably metal, outer casing, or shell, including a cylindrical, or tubular, side wall, or body, portion 5 having an apertured inner partition 6 dividing the casing into upper and lower compartments having a valve opening therebetween and port portions 8 and 9, respectively, for the reception of conduit terminal portions 11 and 12 of a system to be controlled.

Upper and lower end caps 14 and 15, respectively, are screw-threaded, or otherwise secured, and suitably sealed to the body 5; the upper cap 14 fitting the outside of the body and having a hollow exteriorly-polygonal or nut portion 16 extending thereabove and the lower cap 15 fitting the inside of the body. A thickened wall or boss portion 17 is provided, in the top cap 14, for cooperation with a screw 18, extending therethrough, and a lock nut 19. The lower cap 15 is of inverted substantially cup-shape having a central port portion 20 for the reception of a conduit 22 that extends to a place or medium of temperature to be controlled and which, in turn, controls the action of the valve.

A fluid-tight bellows 25, in the lower chamber, is sealed, at its lower end, to the stationary bottom end cap 15 and, at its upper end, to a movable plate 26 that has a depending central boss 27 provided with a slot 28.

A stop member 29, in the lower bellows 25, rests on the bottom end cap 15 and engages the movable bellows end plate 26, in the lowermost position of the latter.

A second fluid-tight bellows 30, in the upper chamber, is sealed, at its upper end, to a ring-like element 32 that is, in turn, sealed to the body 5; the ring 32 being preferably of angle-section having a transverse or radial portion to which the upper bellows edge is sealed and a longitudinal or axially-extending portion 34 fitting a complemental portion 35 of the body 5. The portion 35 is of greater interior diameter than the adjacent interior surface of the body to provide a shoulder on which the ring rests.

The upper bellows 30 is sealed, at its lower edge, to a plate 37 including a depending flange 40 and an upstanding boss 38 having a slot 41 at its upper end.

A compression spring 42 is disposed, in the bellows 30, between the plate 37 and a spring-seat plate or element 43 for adjustment exteriorly of the casing by the screw 18 and the nut 19. This arrangement of parts is for adjusting the force required to open the valve.

A rod 45 extending through the valve opening in the partition 6, has screw-threaded ends 46 in the bosses 27 and 38, thus rigidly connecting the plates 26 and 37; the main body of the rod being of smooth-surface cylindrical form, and of larger diameter than the studs to provide shoulders against which the plates rest.

A movable valve element or disc 47 rests, in the closed position thereof, illustrated in Fig. 1, on an upstanding flange 48 of the partition 6, which also has perimetrally-spaced, depending portions 50 constituting stops for the lower plate 26, in the uppermost position of the latter, and providing for the passage of fluid through the valve opening in this position.

A guide, or guide elements, 51, on the lower plate 26, provide sliding bearing fit between the plate and the partition 6.

The valve, or disc, 47 has a central cylindrical boss 54 providing a long bearing surface that slidably, and closely, fits the main body of the rod 45.

A compression spring 54 surrounds the rod 45 and the boss 53, in floating position between the lower bellows plate 26 and the valve disc 47.

A pivot support 55 is preferably in the form of a thin sheet-metal ring, having its perimeter of hollow, or channel, axial section and closely fitting the inner surface of the casing body 5 on the partition 6. Edge recesses 56 and bottom channel wall openings 59, in the ring 55, as illustrated more clearly in Fig. 4, render the ring of open-work character to facilitate the flow of a fluid or liquid thereabout.

A plurality of levers, preferably not fewer than three, are disposed between the upper bellows plate 37 and the valve disc 47, and have downwardly-extending inner ends 57 engaging the valve at substantially equi-spaced positions about the rod 45. The levers also have portions 58 extending radially of the rod, or along the upper side of the valve disc, and bifurcate outer ends 60, of substantially hook-shape, disposed in openings or slots 61 in the ring 55; this bifurcate, or Y-shape of the levers providing wide pivot bases therefor perimetrally of the ring and preventing undue lateral displacement of the levers.

The levers are also preferably constructed of thin sheet-metal of hollow, or channel, section providing reinforcing ribs 62 that extend from positions adjacent to the inner ends 57 thereof along the radial portions 58 and partially along the bifurcate ends 60; the ribs thereby also being of substantially Y-shape.

The above-described ribbed, or channelled, thin sheet-metal construction of the levers and the pivot support, renders these parts of light weight and great strength.

The depending flange 40, of the upper bellows plate 37, is adapted to engage the levers, at positions closer to the outer pivot ends, than to the inner ends 57, thereof.

In assembling the parts, the valve disc 47 may first be slipped into place from above, following which, the ring 55, with the levers in place, may be placed thereabove. An assembled group, including the rod 45, the plate 37, the bellows 30 and the ring 34, may next be placed in position, followed by the placing of the spring 42, the spring-seat element 43, the top casing cap 14, and the screw 18, with the nut 19 thereon.

With the parts above the partition 6 thus held between the partition and the top cap 14, the spring 54 and the group including the plate 26, the stop 29, the lower bellows 25 and the bottom cap 15 may then be placed in position to complete the structure and render it ready for the reception of the conduits 11, 12 and 22.

In operation, in the closed position of the valve illustrated in Fig. 1, communication between the conduits 11 and 12 is shut off and, if, as intended in a preferred use of the valve, these conduits are the terminals of a closed circuit, fluid flow in the circuit is stopped.

A portion of the remainder of the circuit may be in a main enclosure, or refrigerator box, the temperature of which is to be regulated. This enclosure may also contain another or control enclosure or bulb communicating with the conduit 22, so that, depending upon the temperature of the main enclosure, a fluid in the control bulb will expand or contract. The parts are shown, in Fig. 1, as positioned under the latter condition.

When the fluid in the control enclosure expands, the lower bellows 25 is expanded to move the plate 26 thereof upwardly to position, as indicated in Fig. 2. This movement also carries the rod 45 and the plate 37 of the upper bellows upwardly to release the lever ends 57 from the top sides of the valve disc 47, or rather to release the compression spring 54 to move the valve disc upwardly, while in contact with the lever ends 57.

Since the depending flange 40, on the upper bellows plate 37, engages the levers at positions closer to the outer pivot ends than to the inner ends 57 thereof, the valve disc is thus released for increased movement, by the spring 54, for a given movement of the actuator comprising the lower bellows 25, the lower plate 26, the rod 45 and the plate 37 of the upper bellows. This increased movement is clearly indicated by a comparison of the distance between the plate 26 and the stops 50 in Fig. 1 with the distance between the flange 48 and the valve disc 47, in Fig. 2.

The spring 54 is preferably of a strength substantially just sufficient to support the valve disc 47 without appreciable distortion of the spring and is preferably under substantially just sufficient tension to counterbalance the weight of the levers and to move the same upwardly. Thus the main lifting force is supplied by the actuator and transmitted to the valve disc through the spring, while the latter is expanding to lift the levers.

Having increased movement for a given movement of the actuator, the disc responds instantly and effectively to a very slight volumetric change of the control fluid, so that a valve of very greatly improved characteristics is provided.

Although I have shown and described the parts as constructed in certain manner and for operation in a particular system, they may obviously be varied in construction and relation, and adapted for operation in other systems, within the purview of the invention as claimed.

I claim:

1. In combination, a valve casing including side walls and a partition having a valve opening, a movable valve element, a plurality of lever supports removably telescopically fitting the side walls of casing, an actuator and a plurality of levers pivoted to said support between the actuator and the movable valve element.

2. In combination, a member having a valve opening, opposed-force elements at opposite sides of said opening, a rod rigidly connecting said elements through said opening, a valve for said opening slidably mounted on said rod, and means responsive to movement of the rod for moving the valve a greater distance.

3. In combination, a sealed casing providing communicating chambers and ports, opposed bellows in the chambers sealed relative thereto and including adjacent end plates, a connector between said plates, a valve disc slidably mounted on said connector, a sheet-metal, hollow-section ring fitting the walls of one of said chambers, sheet-metal levers of hollow section having bifurcate ends pivoted to said ring and ends engaging the disc at equi-spaced positions, a flange on one of said plates engaging the levers, a compression spring between the disc and the other plate, a stop between said other plate and the casing, a spring exteriorly-adjustable between the casing and one of the bellows, and means admitting valve-actuating pressure to said one bellows.

4. A valve structure comprising a tubular casing including a partition having a valve opening, movable plates adjacent to said partition at opposite sides thereof, a valve disc between one of the plates and the partition, a rod connecting said plates through the valve opening and the disc, the disc being slidably mounted on the rod, a ring-like element telescopically fitting the casing at one side of the partition, levers extending radially of the rod having axially extending inner ends engaging the disc at equi-spaced positions about the rod and outer ends pivoted to said ring, and a compression spring between the disc and the other plate, said one plate having a flange engaging the levers closer to the outer, than to the inner, ends thereof.

5. In combination a member having a valve opening, a valve-actuator rod extending through the opening, a valve for the opening surrounding, and movable relative to, the rod, and means cooperating between the rod and the valve and operative to move the valve a greater distance than the rod.

6. The combination with a housing including an inner partition having a valve opening and dividing the housing into compartments having ports, a bellows in one of the compartments, an opposing bellows in the other compartment, a spring biasing one of the bellows toward the other, the other bellows having a port for an actuating fluid, and a rod movably mounted in the valve opening connecting the bellows to each other, of a valve surrounding the rod and slidable thereon, a spring between one of the bellows and one side of the valve, and a lever engaging the opposite side of the valve and engaged by a portion movable with the actuator closer to the lever pivot than to the position of engagement of the lever with the valve.

7. In combination, in a valve, a member having a valve aperture, a valve gate reciprocably movable through a predetermined distance for opening and closing said aperture, an actuator reciprocably movable through substantially less than said distance for so moving said valve gate, elements movable relative to said gate and oppositely against said actuator to preclude movement other than the actuating movement thereof, and means operating between said valve gate and said valve-gate actuator for moving said gate a substantially greater distance for, and in response to, each actuating movement of said actuator.

8. In combination, in a valve, a structure providing for valve-gate fluid passage and having valve-gate seat portions, a valve gate reciprocably movable through a predetermined distance toward and away from said seat for closing and opening said passageway, an actuator reciprocably movable through a substantially less distance than, and definitely related to, said distance for so moving the gate, elements imposing opposite forces free from the gate against the actuator to preclude movement of the actuator other than the actuating movement of the actuator, and means operating between the valve gate and the actuator for substantially instantaneously moving all portions of the gate simultaneously off the cooperating portions of said seat in response to any actuating movement of the actuator and by a substantially greater distance, and with a substantially greater speed.

9. In combination, in a valve, a member having a valve-gate aperture, a valve-gate reciprocably movable through a predetermined distance for opening and closing said aperture, an actuator reciprocably movable through substantially less than said distance for so moving said valve gate, elements, one of which is a hollow fluid-tight extensible element, imposing opposite forces free from the gate against the actuator to preclude movement other than the actuating movement of the actuator, means operating between the valve gate and said actuator for moving the gate a substantially greater distance for, and in response to, each actuating movement of the actuator, and means for providing fluid communication between a source of fluid and the interior of said hollow extensible element to extend said element for actuating the actuator.

ALBERT L. LAMBERT.

CERTIFICATE OF CORRECTION.

Patent No. 1,969,806. August 14, 1934.

ALBERT L. LAMBERT.

It is hereby certified that error appears in the printed specification of the above numbered patent requiring correction as follows: Page 3, line 15, claim 1, for "plurality of" read ring-like; lines 15-16, for "supports" read support; and line 17, before "casing" insert the; and that the said Letters Patent should be read with these corrections therein that the same may conform to the record of the case in the Patent Office.

Signed and sealed this 25th day of September, A. D. 1934.

Leslie Frazer (Seal) Acting Commissioner of Patents.